United States Patent Office 3,849,504
Patented Nov. 19, 1974

---

3,849,504
PERFLUOROPOLYETHERS AND PROCESS FOR MAKING
Ronald A. Mitsch, St. Paul, Minn., assignor to Minnesota Mining and Manufacturing Company, St. Paul, Minn.
No Drawing. Continuation-in-part of abandoned application Ser. No. 622,099, Mar. 10, 1967. This application Sept. 27, 1968, Ser. No. 763,357
Int. Cl. C07c 43/12; C08g 22/04
U.S. Cl. 260—615 BF                                        1 Claim

ABSTRACT OF THE DISCLOSURE

This invention relates to a process for producing polyperfluoralkylene oxides by photolysis of oxy di(perfluoroacyl fluorides) optionally together with perfluorodiacyl fluorides and to the polyperfluoroethers produced therefrom having end group functionalities greater than two.

REFERENCE TO RELATED APPLICATION

This application is a continuation-in-part of my copending application Ser. No. 622,099, filed Mar. 10, 1967 now abandoned.

BACKGROUND

Although perfluoropolyethers having functional termination are well-known via the polymerization of perfluoroolefin epoxides (U.S. Pat. No. 3,250,807 to Fritz and Moore), these polyethers are by definition limited to —CF$_2$— to —O— ratios in the polymer backbone of no more than two to one. Furthermore, polymers prepared by the polymerization of perfluoroolefin epoxides generally have an end group functionality of one. Functionalities between one and two have also been reported, but never greater than two.

The literature [Harris, Jr. P. Org. Chem. *30*, 2182 (1965)] discloses the dimerization of perfluoroacyl fluorides by photolytic means, as well as the dimerization of polymers of fluorocarbon epoxides by photolysis of the acyl fluoride terminated polymers. The literature (Ibid.) also discloses the photopolymerization of perfluorodiacyl fluorides (perfluoroglutaryl fluoride) to a polymeric acyl fluoride having a fully fluorinated CF$_2$ backbone. The polymers prepared in this way are typically opaque, inelastic, inflexible solids, and as such have limited utility.

So far as is known to me, no one has heretofore disclosed a process for preparing perfluoropolyethers whereby one cannot only systematically vary the —CF$_2$— to —O— ratios in the backbone of such polymers but also optionally produce in such polymers end group functionalities greater than two. Capacity to vary —CF$_2$— to —O— ratios is desirable in order to control polymer products properties, such as flexibility, and end group functionalities greater than two are desirable in order to provide polymer products which can be usefully crosslinked by reaction with suitable polyfunctional compounds to form rubbery non-fluid solid sealants and binders.

SUMMARY

It has now been found that when oxy di(perfluoroacyl fluorides) of the general formula:

(1)
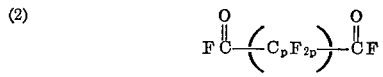

(where *m* and *n* are each a positive whole number of from, and including, 1 through 7) and *a* is an integer from 1 through 8 are irradiated with ultraviolet light optionally admixed together with perfluorodiacyl fluorides of the general formula:

(2)
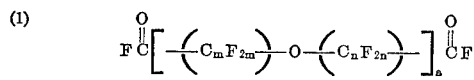

(where *p* is a positive whole number of from, and including, 1 through 7) there are produced polyperfluoroethers wherein both the ratio of —CF$_2$— to —O— in, and the end group functionality of, a polymer product can each be independently varied over wide limits. Thus, by making a predetermined selection of the respective comonomers of formulas (1) and (2) above, as hereinafter described, the —CF$_2$— to —O— ratio can be varied from about 2:1 to 20:1, though usually and even preferably the ratio range is from about 2:1 to 10:1. Ratios greater than 10:1 are less desirable in the sense that such polymers have reduced flexibility and solubility and thus are of less utility. Similarly, as well as by controlling process variables, all as hereinafter described, the end group functionality can be varied from one up to an indefinitely high value which can be as high as ten or even higher, as will be apparent to those skilled in the art, depending upon process conditions and reactants. For purposes of this invention, functionalities greater than 2 are preferred because such products can be crosslinked by reaction with other materials.

For purposes of this invention, a —CF$_2$— to —O— ratio is conventionally measured by fluorine nuclear magnetic reasonance spectroscopy; and, similarly, an end group functionality is conventionally measured by determining the number average molecular weight and dividing by the equivalent weight as determined by titration with base.

In the process of this invention the carbonyl fluoride portion of the acyl fluoride is eliminated, and the residual radicals combined. This reaction is illustrated by the following specific equation:

(3)
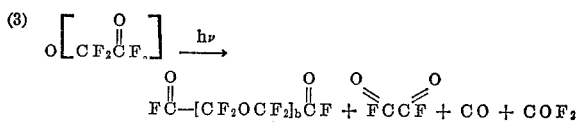

where *b* is an integer of from and including 2 to about 50.

As described hereinafter, a polymer obtained from the process of this invention is characteristically branched such that the overall end group functionality per molecule is at least one and, preferably is greater than 2, as indicated above.

The perfluoropolyethers, as prepared, are terminated with acyl fluoride end groups. The terminal acyl fluoride groups can be converted to acyl chloride or bromide, ester, carboxylic acid and metal and ammonium salts thereof, amide, methylol, nitrile, and perfluoroalkyl groups by techniques known to the art. These acyl fluoride derivations will also have —CF$_2$— to —O— ratios and end group functionalities which can be varied over the wide limits mentioned above, with the molecular weights for these products varying, for example, from 500–15,000, preferably 1,000 to 4,000. These products will have backbone segments of repeating units of the formula:

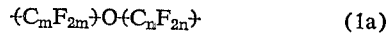     (1a)

and, if copolymers are made using the perfluorodiacyl fluorides of formula (2) above, the backbone in addition will have random segments of repeating units of the formula:

     (1b)

where *m*, *n* and *p* are as defined above for formulas (1) and (2). In the event that acyl fluoride polymer products and their derivatives have end group functionalities greater than 2, e.g., 2.1 to 5, preferably 2.1 to 2.8, the backbone will also have one or more random branched segments of the formula:

$$\begin{array}{c} -CF- \\ | \\ O-R- \end{array} \quad (1c)$$

where R is a side chain made of repeating units, which units have the formula shown in (1a), or, again, if copolymers are made, R will be a mixed side chain made up of random repeating units having the formulas (1a) and (1b), and R itself can have one or more branched segments as shown in formula (1c). Of course, one or more of the branched segments of formula (1c) can also be present in the backbones of those perfluoropolyether polymers of this invention which have end group functionalities of 1 or 2, but these lower functional branched polymers cannot be readily crosslinked with polyfunctional crosslinking agents to produce solid elastomeric products.

It will be understood that in the particular instance where a homopolymerization of an oxygen-containing perfluorodiacyl fluoride of formula (1) in which $m$ and $n$ are equal is carried out, $m$ and $n$ are equal in the product polymer. However, in systems in which copolymerization of either a perfluorodiacyl fluoride and an oxygen-containing perfluorodiacyl fluoride or two different oxygen-containing perfluorodiacyl fluorides are carried out, $m$ and $n$ can be different. The other products of the reaction are oxalyl fluoride, carbonyl fluoride, carbon dioxide, and carbon monoxide.

The perfluorodiacyl fluorides of formulas (1) and (2) above employed in this process are readily prepared by known methods, e.g., by the electrochemical fluorination of the hydrocarbon oxygen-containing diacyl chlorides and by the select photodimerization of perfluorodiacyl fluorides and oxygen-containing perfluorodiacyl fluorides as described in applicants copending application Ser. No. 753,345 filed Aug. 19, 1968 now abandoned. Perfluorooxydipropionyl fluoride and perfluorooxydiacetyl fluoride are preferred types of oxygen-containing perfluorodiacyl fluorides for polymerization in the process of this invention. A more preferred type of oxygen-containing perfluorodiacyl fluorides for polymerization in this process are the higher linear diacyl fluorides of formula (1) wherein $m$ and $n$ are each 1 or 2 and "$a$" is 2 through 8, e.g., $$FOC(CF_2CF_2OCF_2CF_2)_2COF,$$

$$FOC(CF_2OCF_2)_2COF,$$

$$FOC(CF_2OCF_2)_4COF$$

and $$FOC(CF_2CF_2OCF_2CF_2)_4COF,$$

etc., as described applicant's copending application Ser. No. 753,345 filed Aug. 19, 1968. Perfluoroglutaryl fluoride and perfluoroadipyl fluoride constitute preferred types of perfluorodiacyl fluorides for copolymerization with the above mentioned oxygen-containing perfluorodiacyl fluorides in the process of this invention. Chain terminating perfluoroalkyl monoacyl fluorides (whether or not containing ether oxygen) can also be included in the reaction mixture in addition to the diacyl fluorides so as to provide terminating perfluoroalkyl groups if desired. The portions of the oxygen-containing perfluoroalkylene diacyl fluorides to perfluoroalkylene diacyl fluoride may be varied from about 10% up to about 90% of the reaction mixture.

The term ultraviolet light as used herein is used in its conventional sense to mean photon energy having average wavelengths less than about 4000 A. units, the lower limit of wavelength being determined in a specific situation by the transmission characteristics of the material through which the photon energy must pass. The lower limit is usually in the range of 1800 to 2000 A.

Although ultraviolet light of any wavelength between 1800 and 4000 A. may be employed in the present invention, wavelengths of 2000 to 3000 A. are preferred since they are readily produced and provide efficient energy to further expedite the desired reaction. Mercury arc lamps are convenient and commercially available sources of such radiation. Both low and high pressure lamps of this type are commercially available with various types of glass envelopes. The lamps most desirable for use in this process are those having quartz envelopes since they permit the highest transmission of ultraviolet light. I prefer to use a mercury vapor arc lamp of the immersion type fitted within a quartz water-cooled immersion well and to place such assembly within the photolysis chamber of the reactor. Also, I prefer to surround the photolysis chamber with aluminum foil or the like to reduce the amount of ultraviolet light lost. The photolysis chamber or reactor also can be made of quartz or other material that will permit transmission of ultraviolet light and an external ultraviolet lamp is placed in close proximity of the outer wall of the photolysis chamber. For example, an ultraviolet lamp made of quartz in the form of a helix can be used and the photolysis chamber disposed within the helix.

It is desirable that the light source be as close as possible to the reactants and this can be accomplished by placing the lamp in a suitable quartz well projecting into the reaction space. Unless otherwise stated a low pressure 450 watt mercury lamp is employed in the examples below. This lamp has a quartz envelope and is suspended in the center of the reaction vessel. The temperature and pressure of the reaction mixture during conversion are not critical variables and can very well vary within certain ranges. However, it has been generally found that at higher temperature, for example at 100° C., branching reactions leading to functionalities much greater than two are normally obtained. However, at lower temperatures the functionalities of the polymers obtained are between two and three. Although the reactants can be in a gaseous state, it is preferred for reasons of higher efficiency and conservation of space to carry out the reaction in the liquid phase. When the photopolymerization is carried out at elevated temperatures, e.g., 100° C., it has been found that a reflux condenser cooled to a temperature below room temperature is necessary to prevent loss of the more volatile diacyl fluorides. A reaction temperature between about −80 and +150° C. is usually employed. However, a preferred temperature range is from about −20 to +110° C. The presence of diluents, such as inert fluorochemical liquids previously treated to remove any traces of hydrocarbon and hydrofluorocarbon impurities, is very advantageously employed in the preparation of the perfluoropolyethers of this invention since they maintain a homogeneous reaction mixture and permit the achieving of much higher molecular weights than would be possible without suitable solvents. The use of diluents also reduces the amount of cooling necessary to maintain the reaction in the best presently contemplated manner. Solvents which have been found suitable for photopolymerization of oxygen-containing diacyl fluorides include perfluorinated cyclic ethers, perfluorooctane, perfluorokerosene, perfluorocyclohexane, perfluorotributylamine, perfluoro-N-alkylmorpholines, and the like. Solvents boiling above about 20° C. are preferred.

The reaction times will vary widely depending upon the energy of the ultraviolet irradiation used, the amount of oxygen-containing diacyl fluoride monomer used, the concentration, the temperature of the reaction, the pressure in the photoreactor and the desired molecular weight to be achieved. At lower temperatures the use of a purging gas, such as dry, oxygen-free nitrogen, has been found to be advantageous for the removal of the volatile by-products of the reaction such as oxalkyl fluoride, carbonyl fluoride, carbon monoxide, and carbon dioxide. Without such purging, polymers are obtained; however, the efficiency of the photopolymerization decreases. Reduced pressure has also been found to be advantageous for the removal of the volatile by-products of the reaction and leads to improved polymers.

When the polyperfluoroalkylene oxide products produced by the process of this invention have end group functionalities greater than 2, such products are novel.

Generally, the functionalities of the resultant polyperfluoroalkylene oxides of the invention can be varied from about 1 to 10 and can be varied in a somewhat predetermined manner by varying the reaction conditions. Thus, it is found that particularly at temperatures above about 50° C. and with purified perfluorooxydipropionyl fluoride (e.g. greater than 95% purity) a large part of the product contains three or more, and may contain as high as 8 or more acyl fluoride groups per molecule. Extraction of the crude polymer having end-group functionalities between two and five can be accomplished with solvents, such as $CFCl_2CF_2Cl$. Extraction is conveniently carried out by stirring a mixture of the acid or methylol-terminated polymer with 15 milliliters of $CFCl_2CF_2Cl$ per gram of polymer, separating the $CFCl_2CF_2Cl$ layer, and evaporating the $CFCl_2CF_2Cl$ layer to dryness. The polymer soluble in $CFCl_2CF_2Cl$ has a functionality from 2 to 3 whereas the insoluble residue has an end-group functionality of 3 to 8 or higher.

The mechanism by which the perfluoropolyether products having average end group functionalities greater than two, e.g., 2.5, are formed is not well understood. It is theorized, but I do not intend to be bound by theory, that such reactions involve the addition of an $R_fCF_2 \cdot$ free radical to an acyl fluoride group, formation of a new radical, and resulting branchings. In any event, the products with average end group functionalities greater than two will be mixtures of two or more perfluoropolyethers. For example, a homopolymer product with an average end group functionality of 2.5 can be a mixture of the following two perfluoropolyethers each in equal gram equivalent amounts:

(4) 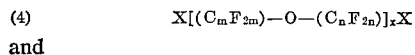

and (5) 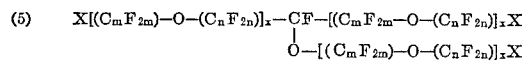

where X is —COX′, —CN, —COOH, —COOR, —CONH₂, —COOM, —CH₂OH (where X′ is a F, Cl, or Br, R is a lower alkyl, and M is —NH₄, or a metal atom), $m$ and $n$ are as described in formula (1) above, and $x$ is the number of indicated repeating units in the polymer or indicated chain segment of the polymer.

The nearly linear polymers can contain two acyl fluoride groups per about 225 molecular weight units up to about two acyl fluoride groups per 10,000 molecular weight units.

Inclusion of monoacyl fluorides in the photopolymerization of diacyl fluorides results in the production of polymeric monoacyl fluorides. Generally, the use of diacyl fluoride starting materials produces principally linear polymeric diacyl fluorides.

A polymer of the present invention has a molecular weight ranging from the weight of the starting material up to about 15,000 or even higher. By making a predetermined selection of the respective comonomers of formulas (1) and (2) above, the —CF₂— to —O— ratio can be varied from about 2:1 to 20:1, though preferably the ratio range is from about 2:1 to 10:1.

The novel polyperfluoroalkylene oxides of this invention are substances ranging from oily or waxy materials when of low molecular weight to resinous or elastomeric solids when of higher molecular weight. They are very resistant toward thermal degradation and, having functionalities greater than two, are usefully crosslinked by reaction with suitable polyfunctional compounds to form rubbery nonfluid solid sealants and binders. They are advantageously employed in binders and sealants since the curing reactions necessary to obtain a physically suitable system require the use of a difunctional or a difunctional admixture with trifunctional curing agent rather than a trifunctional curing agent alone.

The novel polyperfluoroalkylene oxides of this invention have several useful properties. When cured, they are elastomeric materials having chemical resistance (e.g. resistance to the solvent affects of aviation fuel or other fuels, oils, and solvents). The cured products can be used as sealants for fuel tanks of aircraft. Shaped articles, such as O-rings, fuel conduits, etc., can be fabricated from the cured product. They can also be used as lubricants and hydraulic fluids, as well as plasticizers for other fluorocarbon polymers. The methylol-terminated polymers can also be used as intermediates in the preparation of cyanates and cyanurate polymers.

As those skilled in the art will appreciate, a sealant composition in general may have four or five components, such as a base polymer, a curing agent, a filler, a solvent, and sometimes additionally, resins to promote adhesion.

It is desirable to use as a base polymer one having sufficient fluidity so as not to require a solvent as a solvent greatly complicates application of the sealant. The polymers of this invention do not require a solvent for use in sealant compositions.

Fillers are typically in the form of finely divided inert powders and used to reduce the cost of the sealant, improve mechanical properties, and control viscosity, but usually are not essential to a sealant composition. Typical filler concentrations range from about 5 to 100 parts per 100 parts of cured polymer. Common fillers are carbon black, silica, titanium dioxide, various clays, calcium carbonate, zirconium silicate, and the like.

For some highly specialized applications, non-cured sealant compositions are used, but in most applications sealant compositions require curing.

In general, to use an above described sealant composition one conventionally injects same into channels and voids as those familiar with caulking and similar operations will readily appreciate.

Polyurethanes having utility as low temperature metal-to-metal adhesives are prepared by reaction of the corresponding methylol alcohol derivatives with diisocyanates, e.g., $OCN(CH_2)_6NCO$, $O(CH_2CH_2NCO)_2$,

and other diisocyanates.

Another useful application for the methylol-terminated polymers of this invention are those applications requiring a high density castable material, such as binders for solid propellants used in rockets, missiles, flares, shells, etc. In using the methylol-terminated polymers of this invention as binders in solid propellants, the general procedure employed will be to blend the methylol-terminated polymers with the diisocyanate, and then further blend the resulting mixture with the propellant oxidizer and other dry ingredients, such as powdered metal, and then heat the shaped mixture to form a cured propellant grain. Alternatively the binder can be blended with the oxidizer and then with the diisocyanate, after which the composition can be further mixed, shaped, and heated to effect cure. Generally, the propellant oxidizer will be an inorganic oxidizing salt, such as the ammonium, alkali metal, and alkaline earth metal salts of nitric, perchloric, and chloric acids. Mixtures of these oxidizing salts can also be used. Ammonium nitrate and ammonium perchlorate are the preferred oxidizers for use in the solid propellant compositions of this invention. Other applicable oxidizers representatively include sodium nitrate, potassium perchlorate, lithium chlorate, calcium nitrate, barium perchlorate, strontium chlorate, and the like. In the preparation of the propellant compositions, the oxidizers are powdered to sizes generally in the range of from 1 to 300 microns average particle size, preferably in the range between 20 and 200 microns.

The amount of solid oxidizer and fuel (e.g., powdered aluminum) employed will usually be a major proportion of the total composition, and is generally in the range between 50 and 85 percent by weight of the total mixture. The binder in the propellant composition will usually be a minor proportion of the total composition, and is generally in the range between 15 and 50 percent by weight of the total mixture.

The propellant compositions can be formed into a grain having any desired shape or geometry, such as grains of internal, external, and internal-external burning types, and geometries which provide progressive, neutral, or degressive modes of burning.

Further detail on the use of the methylol-terminated polymers of this invention as propellant binders will be omitted in the interest of brevity, since the physical and manipulative steps in preparing solid propellants is well-known in the art (see, for example, U.S. Pat. No. 3,050,-423 the disclosure of which is incorporated herein by reference).

The acid fluoride end groups of the polyperfluoroalkylene ethers of this invention can be converted into various derivatives by classical reactions. For example, they can be converted into carboxylic acids by contact with water and these acids reacted with metal oxides, carbonates, or hydroxides, or with ammonium hydroxide, in water or in an inert reaction medium, to yield the corresponding salts. The acids can also be reacted with phosphorous pentachloride or phthaloyl dichloride to produce the corresponding acid chloride and with phosphorous tribromide or benzoyl bromide to produce the corresponding acid bromide. These acid halide derivatives can be reacted with alcohols to form the corresponding esters which contain the alkyl group of the alcohol. Also, the acid can be reacted with alcohols to yield esters. The amide derivatives can be formed by the reaction of the acid halide precursors or ester precursors with ammonia. The nitrile derivatives can be formed by dehydration of the amide derivatives, for example, with phosphorous pentoxide or benzotrichloride. The methylol derivatives can be prepared by reduction of the acid fluoride or ester precursors by catalytic hydrogenation or with reducing agents, for example, lithium aluminum hydride or sodium borohydride. The above-described acid fluoride derivatives can be cured using poly-functional epoxides, aziridides, trimerization agents, oxetanes, isocyanates, etc., to form sealants, binders, etc., as described above.

The following examples further illustrate the objects and advantages of this invention, but the various materials, and amounts thereof, and other details recited in these examples should not be construed to unduly limit this invention.

EXAMPLES

Examples 1–12

The process and products of this invention are illustrated by the following Examples 1–12 in which the quantities are expressed in parts by weight. A general procedure is given below and the results of several representative photopolymerizations using $O(CF_2CF_2CFO)_2$ as monomer given in Table I.

Photopolymerization.—The reactor consists of an outer Pyrex glass jacket (volume: 215-cc.) which is jointed so as to permit introduction of a water-cooled quartz immersion well. The reactor also contains a sample inlet, a purge gas inlet and an outlet for a condenser. The condenser exit is attached to a Dry-Ice trap.

In the following examples, the reactor is flamed-out under vacuum, cooled to $-196°$ C., and 25–40 g. of perfluorooxydipropionyl fluoride introduced by vacuum distillation. The FC–75 solvent (190 cc.) is then added by a simple pouring technique, under slight vacuum, in the absence of air. The reactor and its contents are then heated to and maintained at 100–105° C. The reaction mixture is stirred with a magnetic stirring bar and purged with dry nitrogen while being photolyzed with a 450-watt low pressure mercury vapor ultraviolet source. Upon completion of the desired photolysis time, the reactor is cooled to room temperature and the contents are poured into a flask suitable for removal of the solvent. The solvent is removed on a rotating evaporator, followed by heating the residwual, non-volatile polymer for about 4 hours at 100° C. at a pressure of about 0.01 to 0.1 mm.

Conversion to the acid or ester is accomplished by addition of water or alcohol, respectively, to a solution of the acid fluoride terminated polymer in FC–75, followed by removal of solvent, excess nucleophile and HF under vacuum. FC–75 is a trade designation by the 3M Company, St. Paul, Minnesota for its brand of perfluorocyclic ether solvent.

TABLE I

| Example | Photolysis time, hrs.[1] | Temp., °C. | $M_n$[2] | Functionality[3] | Comments on products |
|---|---|---|---|---|---|
| 1 | 3 | 105–110 | 950 | 2.1 | Mobile liquid, converted to methyl ester with methanol. Distillation gave dimer, trimer, tetramer and pentamer. |
| 2 | 5 | 105–110 | 1,510 | 2.3 | Mobile liquid, converted to methyl ester with methanol. Distillation gave trimer through heptamer and a dodecamer pot residue. |
| 3 | 10 | 105–110 | 3,700 | 2.7 | Viscous liquid, converted to acid, terminated with water. |
| 4 | 12 | 105–110 | 4,900 | 2.8 | Viscous liquid, converted to acid, terminated polymer with water. |
| 5 | 14 | 105–110 | 6,800 | 2.7 | Very viscous liquid, acid terminated. |
| 6 | 18 | 105–110 | 15,000 | >8 | Semi-solid elastomer, converted to acid term. |
| 7 | 14 | 25–30 | 2,700 | 2.5 | Mobile liquid, converted to acid terminated with water. |
| 8 | 20 | 25–30 | 3,000 | 2.5 | Mobile liquid, converted to acid term. |
| 9 | 15 | 5–8 | 10,000 | >3 | Very viscous liquid, converted to acid term. |
| 10 | 8 | 5–8 | 1,800 | 2.1 | Mobile liquid, acid terminated. |
| 11 | 11 | 5–8 | 4,500 | 2.5 | Viscous liquid, acid terminated. |
| 12 | 15 | 5–8 | | | Very viscous liquid, converted to amide terminated polymer with ammonia. |

[1] Reaction run with 25–40 g. of perfluorooxydipropionyl fluoride.
[2] $M_n$ determined by vapor phase osmometry.
[3] Functionalities determined from equivalent weights obtained by titration with base. 

EXAMPLES 13–18

The procedures described in Examples 1–12, were used with the modification that, after polymerization and conversion to acid-termination, the crude polymer was stirred at 25° C. with 15 ml. of $CFCl_2CF_2Cl$ per gram of crude polymer. After stirring for about 4 hours, the mixture was allowed to stand until the $CFCl_2CF_2Cl$ layer separated. The $CFCl_2CF_2Cl$ layer was decanted from the residual polymer and both were heated at 100° C. at a pressure of about 0.01 to 1 mm. Both the $CFCl_2CF_2Cl$ soluble polymer (the extract) and the residue were weighed and number average molecular weight and equivalent weight determined. Using this modified work-up procedure, the following monomers of formula (1) were photopolymerized to give polyperfluoroalkylene oxides having functionalities greater than two. All reactions were run in a 140 ml. photoreactor fitted with a quartz immersion well and a 450-watt ultraviolet lamp. The photopolymerizations of $$O(CF_2CF_2CFO)_2 \text{ and } OFC(CF_2CF_2OCF_2CF_2)_2CFO$$

were carried out at 100° C. while the photopolymerization of $O(CF_2CFO)_2$ was run at 50° C. Results are shown in Table II.

TABLE II

| Example | Monomer | Concentration (mole/ml.×10⁴)[a] | Photolysis (hr.) | Polymer | $\overline{M}_n$[b] | Functionality[c] |
|---|---|---|---|---|---|---|
| 13 | $O(CF_2CF_2CFO)_2$ | 5.9 | 2.75 (64% extractable)[d] | Crude | 880 | 2.5 |
|  |  |  |  | Extract | 800 | 2.3 |
|  |  |  |  | Residue | 1,200 | 3.2 |
| 14 | $O(CF_2CF_2CFO)_2$ | 6.0 | 5.5 (38% extractable) | Crude | 1,660 | 3.2 |
|  |  |  |  | Extract | 1,225 | 2.5 |
|  |  |  |  | Residue | 2,610 | 4.7 |
| 15 | $O(CF_2CF_2CFO)_2$ | 5.8 | 8.25 (25% extractable) | Crude | 2,900 | 4.6 |
|  |  |  |  | Extract | 1,350 | 2.3 |
|  |  |  |  | Residue | 3,700 | 5.7 |
| 16 | $O(CF_2CFO)_2$ | 5.9 | 8.25 (67% extractable) | Crude | 910 | 2.4 |
|  |  |  |  | Extract | 905 | 2.3 |
|  |  |  |  | Residue | 1,090 | 2.9 |
| 17 | $OFC(CF_2CF_2OCF_2CF_2)_2CFO$ | 6.2 | 2.75 (90% extractable) | Crude | 1,380 | 2.5 |
|  |  |  |  | Extract | 1,210 | 2.3 |
|  |  |  |  | Residue | 2,360 | 3.3 |
| 18 | $OFC(CF_2CF_2OCF_2CF_2)_2CFO$ | 6.0 | 8.25 (53% extractable) | Crude | 2,400 | 2.8 |
|  |  |  |  | Extract | 1,900 | 2.5 |
|  |  |  |  | Residue | 4,800 | 4.7 |

[a] Moles of monomer per milliliter of FC-75 solvent.
[b] $\overline{M}_n$ determined by vapor phase osmometry.
[c] Functionalities determined from equivalent weights obtained by titration with base.
[d] Percent extractable with 15 ml. of $CFCl_2CF_2Cl$ per gram of crude polymer.

EXAMPLES 19–25

Using the procedures described in Examples 1–12, the following monomers of formula (1) and comonomers of formulas (1) and (2) were photopolymerized to give polyperfluoroalkylene oxides having funcionalities greater than two.

TABLE III

| Monomer | Ratio[1] | Temp., °C. | Product properties |
|---|---|---|---|
| Ex. 19: a $O(CF_2CFO)_2$ b $CF_2(CF_2CFO)_2$ | 1:1 | 105 | Low molecular weight oil. |
| Ex. 20: a $O(CF_2CFO)_2$ b $\{CF_2CF_2CFO\}_2$ | 2:1 | 105 | Do. |
| Ex. 21: a $O(CF_2CFO)_2$ b $CF_2(CF_2CFO)_2$ | 5:1 | 25 | Oil. |
| Ex. 22 $OFCCF(CF_3)O(CF_2)_5-CF(CF_3)CFO$ | | 120 | Molecular weight 3,000, viscous liquid. |
| Ex. 23 a $O(CF_2CFO)_2$ b $O(CF_2CF_2CFO)_2$ | 1:1 | 100 | Molecular weight 5,000; colorless viscous oil. |
| Ex. 24 $OFCCF_2CF_2[O(CF_2)_4]_3O-CF_2CF_2CFO$ | | [2] 150 | Molecular weight 10,000; very viscous oil. |
| Ex. 25: a $OFC(CF_2)_5OCF(CF_3)CFO$ b $O(CF_2CF_2CFO)_2$ | 1:1 | 65 | Low molecular weight oil; more viscous and less soluble than homopolymers of $O(CF_2CF_2CFO)_2$. |

[1] This is the ratio of a:b.
[2] Under vacuum.

Example 26

This example describes a typical photopolymerization of perfluoroxydipropionyl fluoride and its reduction to the methylol-terminated polymer which has utility as a high density solid propellant binder.

The procedure involves initially attaining a number averaged molecular weight of about 700 by exposing volatiles (essentially monomer) selectively to ultraviolet radiation in three 24-hour periods. Further reaction of the total mixture is then carried out to obtain the desired molecular weight.

A 626.4 gram sample of perfluoroxydipropionyl fluoride was distilled into a 530 ml. capacity quartz stirred tank reactor, which had been previously purged overnight with dry nitrogen. Then 288.6 grams of dry FC-75 (an inert fluorocarbon) were charged. The required ultraviolet radiation was supplied by a 450-watt and a 550-watt Hanovia Laboratory-scale, mercury vapor lamps used in conjunction with two elliptical reflectors of Alzak aluminum. Both the lamps and the reactor were air-cooled.

After the first 24-hour period of irradiation, the reaction mixture was dropped into a still-pot from which the volatiles (maximum lead temperature=100° C.), which consisted essentially of the monomer (b.p. 67° C.) and FC-75 (b.p. 100° C.), were distilled into the reactor, and 354 grams of FC-75 were added to fill the reactor to capacity before the second 24-hour reaction period followed. A further 248 grams of FC-75 were added to the reactor at the end of the second 24-hour period. A third 24-hour period was necessary to completely react the monomer. The analyses of samples removed at the end of each of these initial steps revealed that $\overline{M}_n$ at the completion of the first, second, and third 24-hour periods were 465, 685, and 700 respectively, while the functionality remained at about 2.

After the third 24-hour period, the total reaction mixture was circulated through the reactor continuously until the desired molecular weight was attained. Samples were periodically taken and analyzed. The increase in molecular weight and equivalent weight with reaction time during the final reaction period are as follows:

| Reaction time, hours | $\overline{M}_n$ | Equivalent weight |
|---|---|---|
| 49 | 1,220 | 446 |
| 61 | 1,300 | 492 |
| 73 | 1,575 | 513 |
| 90 | 2,000 | 744 |

The $\overline{M}_n$ and equivalent weight values were determined with acid terminated polymer. The reaction was terminated at the $\overline{M}_n$ and equivalent weight values of 2000 and 744, respectively.

The reactor contents were emptied into a 2-liter flask, and the reactor was rinsed with 500 ml. of FC-75 which was drained into the same distillation flask. The FC-75 present was then distilled from the polymer which was subsequently esterified in 100 ml. of methanol and 1000 ml. of ether. The two phases (ether soluble and ether insoluble) resulted and were separated. The ether phase was washed 6 times with deionized water to remove the residual HF produced in the esterification reaction, and then dried with 600 grams of Drierite. After the removal of the solvent 342.4 grams of methyl ester-terminated polymer were obtained. The ether insoluble gel amounted to 45.2 grams.

To reduce the 342.4 grams of methyl ester-terminated polymer to the corresponding methylol derivative, 30 grams of $LiAlH_4$ were dissolved in 400 ml. of dry ether in a 3-liter flask by stirring overnight under a nitrogen atmosphere. The polymer was dissolved in 600 ml. of ether and added dropwise to the $LiAlH_4$ solution. The reaction mixture was then refluxed for 2 hours.

Methanol in the amount of 200 ml. was then added to decompose the excess $LiAlH_4$. This was followed by the addition of 200 ml. of 36 N $H_2SO_4$ in 1620 ml. of deionized water. After an hour of agitation, a clear organic and an aqueous layer were obtained. The latter was washed 4 times with deionized water and dried with 500 grams of Drierite.

On removal of ether in a continuous Rotovac, 289.5 grams of methylol-terminated perfluorotetramethylene oxide polymer were obtained. The yield in this reduction step was 86%.

For purposes of this disclosure, it will be appreciated that such terms as perfluoropolyethers, polyperfluoroethers, polyperfluoroalkylene ethers, and polyperfluoroalkylene oxides are used synomonously.

I claim:
1. Polyperfluoroalkylene oxides having molecular weights in the range of 500 to 15,000, carbon-to-oxygen backbone ratios from 2:1 to 20:1, an average of 2.1 to 5 methylol end groups, and backbones consisting of repeating units of the structure

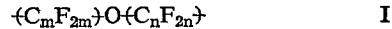   I where $m$ and $n$ are integers of 1 to 7, and one or more randomly distributed branched units of the structure

   II where R is a side chain made of the repeating units of said structure I.

References Cited
UNITED STATES PATENTS

| | | | |
|---|---|---|---|
| 3,250,806 | 5/1966 | Warnell | 260—535 |
| 3,282,875 | 11/1966 | Connolly et al. | 260—615 R |
| 3,291,843 | 12/1966 | Fritz et al. | 260—615 R |
| 3,310,606 | 3/1967 | Fritz | 260—615 R |
| 3,450,684 | 6/1969 | Darby | 260—615 R |

OTHER REFERENCES

Hudlicky, "Chemistry of Organic Fluorine Compounds," 1962, p. 201.

Harris, "J. Org. Chem.," vol. 30, (1965), pp. 2182–90.

JOSEPH E. EVANS, Primary Examiner

U.S. Cl. X.R.

149—19, 44, 60, 61, 76, 83; 204—158; 252—1, 54, 54.6, 73, 74; 260—31.2 R, 33.2 R, 77.5 AP, 465.2, 484 R, 535 P, 544 F, 544 K, 561 HL

UNITED STATES PATENT OFFICE
CERTIFICATE OF CORRECTION

PATENT NO. : 3,849,504
DATED : November 19, 1974
INVENTOR(S) : Ronald A. Mitsch

It is certified that error appears in the above-identified patent and that said Letters Patent are hereby corrected as shown below:

Column 1, line 37, "P." should read -- J. --;

Column 2, line 39, in the first set of brackets of formula (3),

"$\begin{bmatrix} O \\ \| \\ CF_2CF \end{bmatrix}$" should read -- $\begin{bmatrix} O \\ \| \\ CF_2CF \end{bmatrix}_2$ --;

Column 8, line 21, "residwual" should read -- residual --.

Signed and Sealed this

*thirtieth* Day of *September 1975*

[SEAL]

Attest:

RUTH C. MASON
*Attesting Officer*

C. MARSHALL DANN
*Commissioner of Patents and Trademarks*